United States Patent Office 2,922,378
Patented Jan. 26, 1960

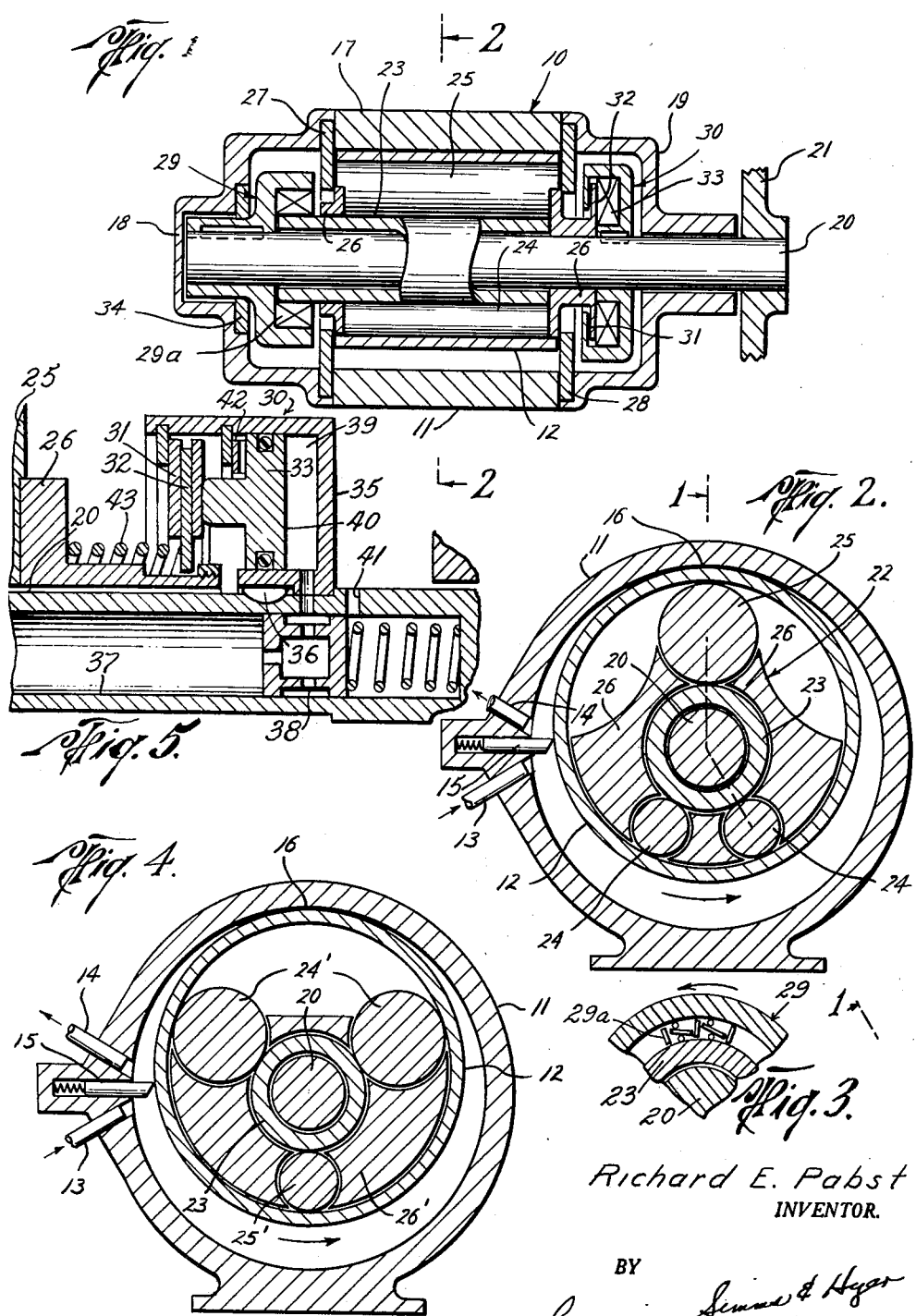

2,922,378

ROTARY PUMP

Richard E. Pabst, San Antonio, Tex.

Application June 20, 1955, Serial No. 516,671

3 Claims. (Cl. 103—130)

This invention relates to improvements in rotary pumps or compressors. In one of its aspects, this invention relates to a crankless type rotary pump or compressor having internally arranged speed changing mechanism. In another of its aspects, it relates to a piston for a crankless type rotary pump or compressor having an improved planetary system for imparting planetary motion thereto.

In the crankless type rotary pump or compressor, the conventional crankshaft for imparting planetary movement to the piston is replaced by a planetary system within the piston such that the drive shaft may rotate about an axis fixed with respect to the pump or compressor cylinder. Such a system is mounted within the piston for rotation by the drive shaft about an axis eccentrically of the piston. Inherent in a rotary pump or compressor of this type is a compact structure which is readily adaptable for dynamic balancing without the use of external counterweights.

Refrigeration systems for automobiles have presented unique problems in compressor design since the only adequate power source is the automobile engine which may operate in a range varying from 500 to 8,000 r.p.m. Thus, not only must such compressors be substantially free from noise and vibration, but also they require a means of decreasing their speed to prevent overloading during high speeds of the automobile and of increasing their speed to provide adequate refrigeration at low automobile speeds. Also, the need for compactness of structure is even more acute in the case of compressors for automobile refrigerator systems.

An object of this invention is to provide a crankless type rotary pump or compressor capable of multi-speed operation without the use of external speed changing mechanism.

Another object is to provide a rotary pump or compressor in which the planetary system within the piston serves not only to impart planetary movement thereto but also as part of a mechanism for selectively changing the speed thereof.

A further object is to provide a planetary system for imparting planetary movement to a rotary pump piston which facilitates static as well as dynamic balancing of the piston.

Yet a further object is to provide such a planetary system so constructed as to provide the desired sealing effect of the piston with the cylinder during planetary movement thereof.

A still further object is to provide a planetary system in which the parts thereof make up a rolling frictional drive between the drive shaft and piston which may be so designed as to enable optimum loading characteristics for the system.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a longitudinal sectional view of a pump or compressor constructed in accordance with this invention, and taken substantially along broken line 1—1 of Fig. 2;

Fig. 2 is a cross-sectional view of the pump or compressor of Fig. 1 upon an enlarged scale, and taken substantially along broken line 2—2 of Fig. 1;

Fig. 3 is a detailed view upon a still further enlarged scale of a typical one-way clutch which may be used in the construction of Figs. 1 and 2;

Fig. 4 is a cross-sectional view similar to Fig. 2 of another embodiment of the pump or compressor of the present invention; and Fig. 5 is a cross-sectional view of a fluid-actuated clutch which may be used in the constructions of either Figs. 1 and 2 or Fig. 4.

In the crankless type rotary pump or compressor of the present invention, wherein the piston drive shaft rotates about an axis fixed with respect to the cylinder and planetary motion is imparted to the piston by a planetary system within the piston, such planetary system is so constructed as to provide two parts selectively connectable with the drive shaft in a manner to permit the piston to be rotated at different speeds.

More particularly, the planetary system comprises a sun roller rotatable about an axis eccentrically disposed of the piston axis and fixed with respect to the cylinder, a planet roller tangentially engageable between the sun roller and inner periphery of the piston to provide a drive connection therebetween, and an arm connecting the sun and planet rollers. Thus, apparatus operative to provide direct driving engagement of the shaft with one of the sun roller and arm will enable the system to be selectively rotated at a lower and higher speed, respectively.

The drive shaft is disposed concentrically within the sun roller, such that the apparatus for drivingly engaging the shaft with one of the sun roller and connecting arm may comprise a one-way clutch between the drive shaft and sun roller for driving the sun roller in response to rotation of the shaft but permitting free-wheeling of the shaft in response to rotation of the sun roller, and another clutch connected to the shaft which is normally engageable with the arm to provide a direct driving connection between the arm and shaft, but which is disengageable therewith to permit the sun roller to be driven directly by the shaft. Preferably, the last-mentioned clutch is automatically disengaged from the arm upon an increase in the speed of rotation of the drive shaft to a predetermined amount.

In accordance with another novel aspect of this invention, a plurality of such planet rollers are disposed about the sun roller and connected in fixed spaced relation to one another by a carrier-like arm in a manner to facilitate static balancing of the piston and further improve the functions thereof in a manner to be described. With the sun roller rotatable about an axis eccentric of the piston axis, at least two of the planet rollers are of different diameters.

The drive connection between the drive shaft and piston may be provided by a frictional rolling contact of the planet rollers with the sun roller and piston. Maximum pump life is obtained by a planetary system including such rollers which may be so designed as to reduce the loading on the rollers to the minimum required for insuring such frictional contact.

Referring now particularly to the drawings, there is shown in Fig. 1 a pump or compressor 10 which is constructed in accordance with the present invention, and which will be referred to hereinafter and in the claims in its generic sense as a "pump." This pump comprises a cylinder 11 and a piston 12 movable in a planetary path within the cylinder so as to establish constantly changing line contact with the inner periphery thereof.

Thus, with reference to Fig. 2 and assuming rotation in the direction of the arrow, fluid is admitted into the space between the cylinder and piston through inlet 13 and discharged therefrom through outlet 14. In a manner well known in the art, the high and low pressure sides of the pump are defined by spring-pressed knife blade 15 and the line of contact between the piston and cylinder at 16.

Referring to Fig. 1, the cylinder 11 is composed of a central portion 17 within which the piston 12 moves and end portions 18 and 19. A drive shaft 20 is rotatable within the pump or compressor about an axis fixed with respect to the cylinder, cylinder end portion 18 serving as a bearing for the free end of the drive shaft and cylinder end portion 19 serving as a journal for its opposite driven end. The driven end of the drive shaft may be connected to any suitable power source by a pulley wheel 21.

As will be described more fully hereinafter, the piston 12 is hollow and receives a planetary system, designated in its entirety by the reference character 22 (Fig. 2), to which the drive shaft 20 is connected for rotating the planetary system about an axis eccentrically disposed of the piston. In this manner, and further as well known in the art, the piston has a planetary movement with respect to the fixed axis of the drive shaft, with its stroke being determined by the eccentricity thereof with respect to the drive shaft and cylinder.

In accordance with the present invention, the planetary system 22 comprises a rotatable sun roller 23 and one or more planet rollers 24, 25 disposed about the sun roller for tangential rolling engagement between the sun roller and inner periphery of the hollow piston so as to provide a drive connection therebetween. There is no sliding contact between the rollers and inner periphery of the piston and this tangential engagement may be provided by the frictionally engaging smooth rollers shown or by equivalent means. As can be seen from the drawings, each such roller extends longitudinally within the piston and the planet rollers are held in fixed spaced relationship to one another by means of carrier 26 which extends lengthwise of the rollers and is freely rotatable about sun roller 23. In this manner, it will be understood that a direct connection between drive shaft 20 and carrier 26 will rotate the planetary system and move the piston 12 in a planetary path with respect to its eccentric axis at the same speed as said drive shaft. On the other hand, a direct driving connection between the shaft 20 and sun roller 23 will rotate the planetary system and move the piston in its planetary path at a lower speed dependent on the relative sizes of the rollers.

Referring now again to Fig. 1, the planetary system 22 is confined at opposite ends within the central portion 17 of the cylinder by means of plates 27 and 28 secured between such central portion and end portions 18 and 19, respectively. The drive shaft 20 is received concentrically through sun roller 23 for free rotation with respect thereto, one end of the shaft extending beyond such roller and being splined to a clutch 29 disposed within cylinder end portion 18. As can be seen from the drawings, the clutch 29 surrounds said end of the shaft to provide a bearing part therefor in cylinder end portion 18, and includes a mechanism 29a providing a direct drive connection between shaft 20 and sun roller 23.

Another clutch 30 is splined to drive shaft 20 and is disposed within end portion 19 of the cylinder at the opposite end of the planetary system. As indicated diagrammatically in Fig. 1, this clutch 30 may include a disc 31 normally engageable with a disc 32 of carrier 26, but selectively disengageable therefrom upon actuation of a part 33 to be described.

The clutch 29 is of the one-way or free-wheeling type, a typical embodiment of which is shown diagrammatically in Fig. 3. Thus, with reference to this figure, the mechanism 29a will be seen to be disposed within an annular space disposed between the clutch housing and the periphery of the sun roller 23, and to include a plurality of chambers arranged within the space circumferentially of the sun roller. A roller element is disposed in each chamber for frictional engagement with a convergent end thereof. More particularly, the innermost chambers are convergent in a direction clockwise of the sun roller while the outermost chambers are convergent in a direction counterclockwise thereof, so that rotation of the drive shaft 20 in the direction of the arrow will serve also to rotate sun roller 23, while rotation of the sun roller in the same directional sense will permit clutch 29 to free-wheel, such that it may be said that sun roller 23 is not operable to drive the drive shaft 20.

As previously mentioned, disc 31 of clutch 30 is normally in engagement with disc 32 of carrier 26 such that said carrier is driven by the drive shaft. Since clutch 29 is free-wheeling with respect to the sun roller 23, when the clutch 30 is operably engaged the planetary system and thus the piston 12 will be driven at the same speed as the drive shaft 20. However, in a manner to be discussed more fully hereinafter, the clutch part 33 comprises any suitable well known mechanism which may be selectively actuated for disengaging discs 31 and 32 such that drive shaft 20 will not drive the carrier 26. In this manner, the clutch 29 is operable for driving sun roller 23 such that the planetary system 22 and piston of the pump or compressor will be driven at a lower speed.

The planetary system 22 shown in the embodiment of Fig. 2 includes two planet rollers 24 of equal size and a comparatively larger planet roller 25. It is obvious that these planet rollers transmit the force of the piston in acting against fluid pressure to seal at 16 with the cylinder. As previously mentioned, crankless type pumps or compressors having a planetary system for moving the piston thereof within the cylinder inherently provide a convenient means for dynamically balancing the piston without the use of external counter weights. However, in accordance with the present invention, the illustrated planetary system 22 also greatly facilitates the static balancing of the piston about the axis of drive shaft 20. That is, carrier or arm 26 provides a mass which may be so shaped and distributed as to be equal and opposite to the unbalance of the rollers 24, 25 due to the eccentricity of the axis of sun roller 23. The mass of the illustrated carrier 26, as it is shown in the cross section of Fig. 2, is obviously concentrated about the smaller planet rollers 24 so as to counteract the heavier planet roller 25. Of course, it is not the intention of this description to provide specific details of a balanced system, but rather to disclose the concepts of the present invention which will enable one skilled in the art to design such details in practicing the invention.

This novel planetary system also provides a means by which the force of the piston may be transmitted in the manner desired. More particularly, the force transmission is controlled by the proper placement of the relatively smaller and larger planet rollers with respect to the sun roller. Thus, for example, in the embodiment shown in Fig. 2, the larger planet roller 25 is larger than equally sized rollers 24 and transmits the force directly from the piston to the cylinder in sealing along line 16. On the other hand, in the embodiment of Fig. 4, wherein planet roller 25' is smaller than equally sized planet rollers 24', the sealing force of the piston to the cylinder is transmitted as a flexural load. In this connection, this latter arrangement of the planet rollers permits the fluid on the high pressure side of the pump to deform the piston a maximum amount at the point of seal or line contact 16 with the inner periphery of the cylinder. Although this deformation may be small, and for that reason is not shown in the Fig. 4 embodiment, it may be found to provide improved results.

It will be noted further in connection with the Fig. 4 embodiment that due to the different arrangement of planet rollers, the carrier or arm 26' is also shaped differently from carrier 26 of the Fig. 2 embodiment, so as to facilitate the afore-mentioned static balancing of the piston.

It will be understood that during each revolution of the piston the torque transmitted through the planetary system will vary from a minimum to a maximum during the compression stroke somewhat before the line contact 16 reaches blade 15. When, as illustrated, the rollers are smooth and the drive connection provided by the planetary system between the drive shaft and piston requires a frictional rolling engagement therebetween to avoid slippage, there is a minimum amount which the rollers must be loaded to prevent such slippage, and such loading is a function of the torque and coefficient of friction of the rollers and piston.

At the same time, it is desired to reduce the loading on the rollers to the minimum required in order to obtain maximum pump life. The planetary system of this invention enables the selective loading of the rollers for accomplishing this purpose.

Although no attempts have been made herein to design a particular planetary system for a special job, it should be noted that in operation of the pump there will develop a net force across the piston 12 due to the force of high pressure acting upon an area of the piston between the line contact 16 and blade 15 on the high pressure side of the piston less the force of low pressure acting on an area of substantially the same size on the low pressure side of the piston. The vectorial summation of the loads upon the rollers will thus be equal and opposite to such effective net force across the piston. As a result, it is a matter of design to so arrange the eccentricity of the planetary system 22 and angular disposition of the rollers so as to obtain the optimum conditions noted above.

In this latter respect, it should be understood that this system is not limited to three or any particular number of rollers, the number as well as size of such rollers depending upon the desired loading.

As previously mentioned, it is contemplated that the disc 31 normally will be engaged with disc 32 for driving the piston at a relatively high speed, but is disengageable therefrom for driving the piston at a relatively lower speed. It is preferred that disengagement of the discs be made automatically responsive to the attainment by drive shaft 20 of a predetermined speed by means of a conventional servo-control.

Thus, the clutch 30 may be a piston operated disc-type clutch having a servo-control of the type extensively used in present automatic automobile transmissions, and as shown diagrammatically in Fig. 5. For example, the servo-control may operate upon an increase in the oil pressure from a pump, which may be located as shown at 34 in Fig. 1 so as to be driven by the drive shaft 20. Thus, at relatively low speeds of the drive shaft 20, pressure fluid supplied through a passageway 37 in the shaft will pass through the spring pressed transfer valve 38 and into the pressure chamber 39 behind the piston 40 so as to urge the discs 31 and 32 into operative engagement with one another. However, as the speed of the drive shaft increases and the pressure of the fluid reaches a predetermined value, the force of the spring is overcome to perimt shifting of the valve 38 and venting of the chamber behind the piston through a port 41 communicating with a low pressure source. Upon venting of this chamber 39, piston 40 is urged to the right by a spring 42, and disc 32 is urged out of operative engagement with disc 31 by means of a coil spring 43. As also shown in Fig. 5, the actuating part 33 including the piston 40 is contained within a housing 35 of the clutch 30 which is splined to the shaft 20 as at 36.

It is also contemplated that additional means (not shown) may be supplied for providing the pump or compressor with an idle or off position. This may be accomplished by means of any number of known methods for rendering each of the clutches 29 and 30 inoperable.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A rotary pump, comprising a cylinder having inlet and outlet ports, a hollow piston within the cylinder and having an outer cylindrical surface of lesser diameter than the inner diameter of the cylinder to provide a pump chamber therebetween, a planetary system within the piston comprising a sun roller mounted for rotation coaxially of the cylinder, a carrier rotatably mounted about the sun roller, planet rollers carried by the carrier for tangential engagement between the sun roller and piston to provide a drive connection therebetween, means for rotating the planetary system about the axis of the sun roller, at least two of said planet rollers being of different diameter to impart planetary motion to the piston with respect to the axis of the pump cylinder, and said piston being of such diameter as to establish constantly changing contact with the cylinder during said planetary motion, and means dividing the pump chamber intermediate the inlet and outlet ports.

2. A rotary pump of the character defined in claim 1, wherein said rotating means includes a drive shaft mounted on the cylinder for rotation coaxially of the sun roller, and including means for selectively providing direct driving engagement of said shaft with one of the sun roller and carrier for rotating the planetary system at different speeds.

3. A rotary pump of the character defined in claim 2, wherein said last-mentioned means comprises a one-way clutch between the drive shaft and sun roller for rotating said sun roller in response to rotation of said shaft but permitting free wheeling of the shaft in response to rotation of the sun roller, and another clutch operable upon actuation for rotating said carrier in response to said shaft.

References Cited in the file of this patent
UNITED STATES PATENTS

| | | |
|---|---|---|
| 75,811 | Talpey | Mar. 24, 1868 |
| 254,069 | Taylor | Feb. 21, 1882 |
| 605,844 | Belanger | June 24, 1898 |
| 908,365 | Ward | Dec. 29, 1908 |
| 1,043,697 | Hayes | Nov. 5, 1912 |
| 1,659,107 | Hvid | Feb. 14, 1928 |
| 1,700,038 | Feuerheerd | Jan. 22, 1929 |
| 1,738,662 | Morison | Dec. 10, 1929 |